United States Patent [19]

Stewart et al.

[11] 4,131,877
[45] Dec. 26, 1978

[54] LOW TIRE PRESSURE INDICATOR CIRCUIT

[75] Inventors: John A. Stewart, Flint; Wayne C. Nichols, Corunna, both of Mich.

[73] Assignee: General Motors Corporation, Detroit, Mich.

[21] Appl. No.: 809,789

[22] Filed: Jun. 24, 1977

[51] Int. Cl.² .............................................. B60C 23/02
[52] U.S. Cl. .................................... 340/58; 200/61.25
[58] Field of Search ...................... 340/58; 317/155; 200/61.22, 61.25; 116/34 R

[56] References Cited

U.S. PATENT DOCUMENTS

| | | | |
|---|---|---|---|
| 3,638,180 | 1/1972 | Lejeune | 340/58 |
| 3,736,467 | 5/1973 | Meier et al. | 317/11 A |
| 3,961,309 | 6/1976 | Eddy | 340/58 |
| 4,004,270 | 1/1977 | Claxton et al. | 340/58 |

*Primary Examiner*—Alvin H. Waring
*Attorney, Agent, or Firm*—Warren D. Hill

[57] ABSTRACT

In a system having a pressure sensor on a vehicle tire for generating a magnetic field when tire pressure reaches a predetermined value, an indicating circuit includes a stationary reed switch which is closed when subjected to the magnetic field, a coil in series with the reed switch which develops a magnetic flux when the switch closes to latch the switch closed, and an indicator lamp in series with the reed switch which is continually illuminated when the switch is closed to provide a low tire pressure warning. A test circuit energized when the vehicle ignition key switch is in "start" position includes a pulse forming circuit for generating a current pulse in the latching coil to close the reed switch and provide an indicator light if the indicator circuit is operative. Power to the indicator circuit is interrupted when the key switch is moved from the "start" position to "run" position so that the coil is momentarily de-energized and the switch opened thereby placing the indicator circuit in readiness for sensing a magnetic field from the pressure sensor.

3 Claims, 3 Drawing Figures

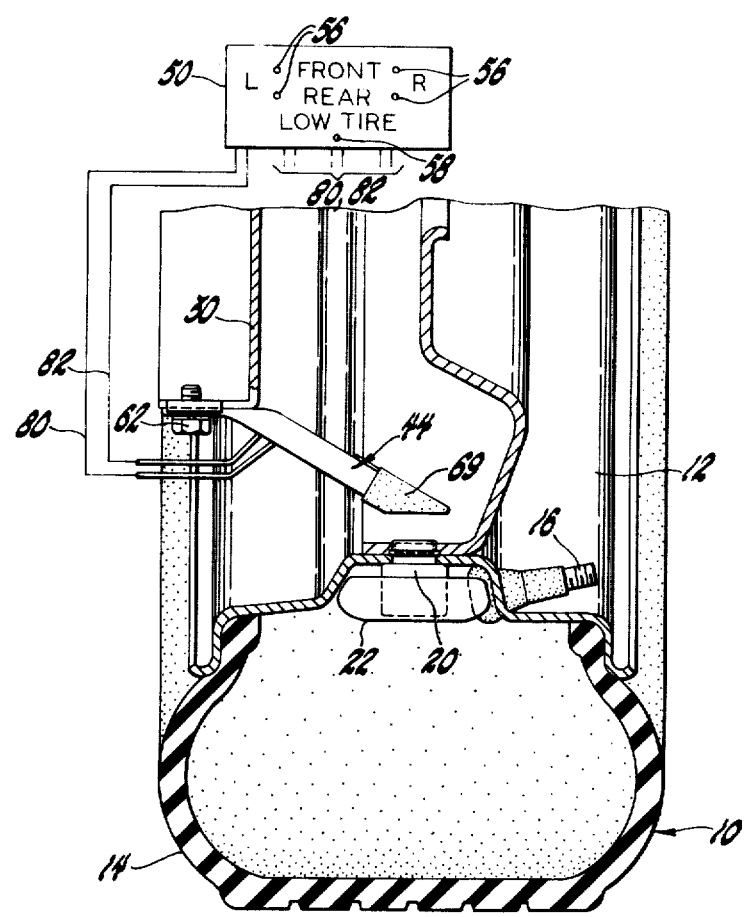
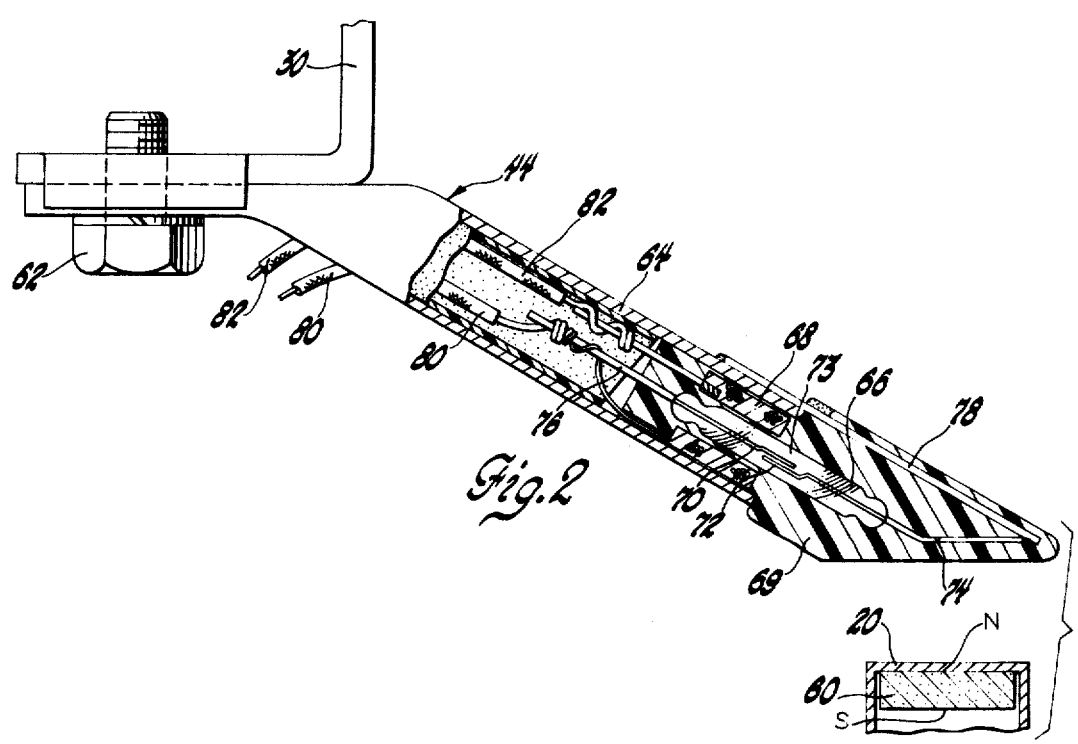

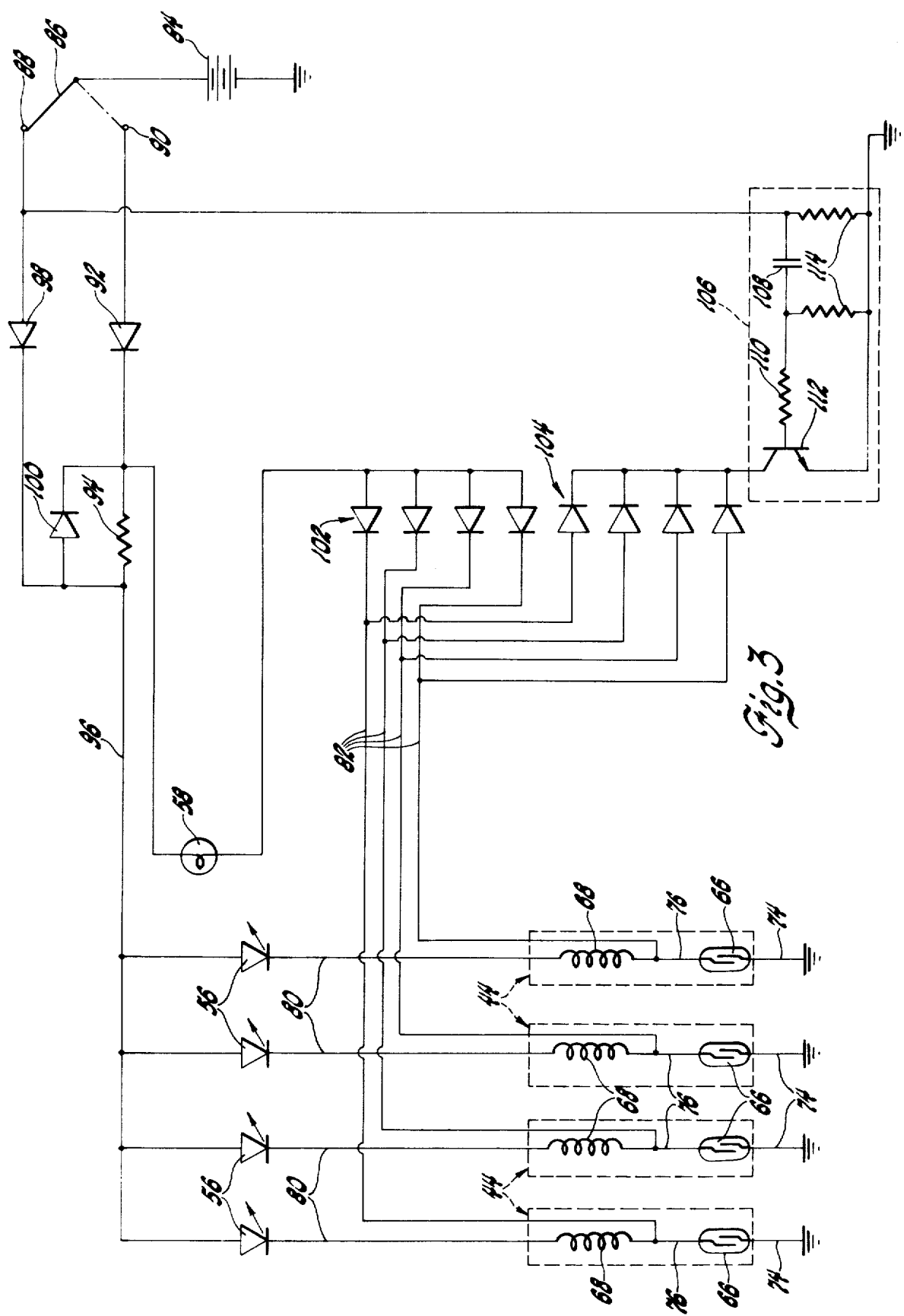

LOW TIRE PRESSURE INDICATOR CIRCUIT

This invention relates to a low tire pressure indication system and particularly to such a system including an indicator circuit with a self-check provision.

It has been proposed to equip pneumatic tire vehicles with systems to alert the vehicle operator when the pressure of a tire has dropped a certain amount below its operating pressure. In one type of system a wheel mounted air switch responsive to tire pressure produces a pneumatic signal when the tire pressure falls below its normal range and that signal activates an actuator which extends a magnet into a warning position. Upon wheel rotation, the magnet periodically passes a chassis mounted magnetic field sensor which provides a warning signal to the vehicle operator. Such a system is shown, for example in the U.S. Pat. to Lorenze et al 3,977,355. The sensor and indicating circuit preferably should store the low pressure information to provide a continuous warning signal. Moreover it is desired to occasionally check the integrity of the indicator circuit to assure all elements are operable.

It is therefore a general object of this invention to provide a latch in the indicator circuit of a low tire pressure warning system to store the information of a low pressure event and a circuit to check the operability of the indicator circuit.

It is another object of this invention to provide in such an indicator circuit a circuit for checking the operability of each element in the indicator circuit by manual selection of a self-check mode and particularly to actuate the self-check mode each time the vehicle ignition switch is moved to "start" position.

The invention is carried out by providing a magnetic field sensor comprising a normally open reed switch which is closed in response to the magnetic field from a tire pressure sender during low tire pressure condition, a latching coil magnetically coupled to the reed switch and electrically in series with the reed switch to hold the reed switch closed upon sensing the low tire pressure event, an indicator in series with the reed switch for providing a warning when the reed switch is closed, and further providing a pulse forming circuit activated upon closure of a control switch, the pulse forming circuit being energized to provide a current pulse to the latching coil sufficient to close and latch the reed switch thereby providing an indicator warning if the circuit is operable, the warning remaining until the control switch is moved to another position to momentarily interrupt power to the indicator circuit to allow the reed switch to return to its open standby position.

The above and other advantages will be made more apparent from the following specification taken in conjunction with the accompanying drawings wherein like reference numerals refer to like parts and wherein:

FIG. 1 is a partial view of a wheel and tire assembly illustrating a low pressure warning system including an indicator circuit according to this invention;

FIG. 2 is a sectional view of a chassis mounted sensor of FIG. 1; and

FIG. 3 is a schematic diagram of the indicator circuit according to the invention.

Referring to FIG. 1, there is illustrated a wheel assembly comprising a wheel 10 including a rim 12. A tire 14 is mounted on the rim which also contains a valve stem 16 for tire inflation. A sender 20 of which several varieties are known is mounted on the rim 12 within the tire and has a portion extending through an aperture in the rim and sealed to prevent air leakage from the tire by conventional means not shown. The purpose of the sender is to monitor the tire inflation pressure and produce an external magnetic field when the pressure decreased to a specified level. Typically a sender includes a movable magnet which is held in a magnetically shielded position while tire pressure is normal and is moved to an exposed position when pressure falls to a low value so that the external magnetic field increases from a low value to a high value. A protective cover 22 surrounds the portion of the sender within the tire to protect it from damage during tire installation.

A stationary backing plate 30 mounted adjacent the wheel has a sensor 44 secured thereto at one end and having the other end extending to a point adjacent the path traced by the sender 20 during wheel rotation. Electric conductors 80 and 82 couple the sensor to a signal processor and instrument panel display unit 50. Sensors associated with other tires are similarly connected to the display unit 50 by other conductors 80, 82.

The display indicators are preferably in the form of light emitting diodes (LED) 56. A master warning lamp 58 comprising an incandescent lamp provides a master warning to gain the operator's attention when a low tire pressure event occurs while the illumination of one of the LED's 56 specifies the location of the tire which causes the signal.

FIG. 2 illustrates in detail the sensor 44 which responds to the magnetic field from a magnet 60 carried by the sender 20 movable past the sensor. The magnet has opposed poles corresponding to each magnet face indicated by notations N, S, in FIG. 2 to produce a flux field extending directly toward the sensor 44. The sensor 44 is secured to the backing plate 30 by a fastener 62. The backing plate 30 is fixed relative to the wheel axis and is mounted, for example, on the stationary portion the wheel brake, not shown. An outer generally cylindrical housing 64 supported by and electrically grounded through the plate 30 is made of magnetic material in order to shield the interior thereof from the magnetic field of the magnet 60. A reed switch 66 is mounted partially within the housing 64 with one end thereof projecting from the housing and an electrical coil 68 mounted within the housing surrounds the other end of the reed switch 66. A pair of normally open reed switch contacts 70 and 72 are enclosed in a capsule 73 of glass or the like and have corresponding leads 74 and 76 of magnetic material extending axially therefrom. The lead 74 is bent at an angle to the reed switch in order to lie parallel to the path of the magnet 60. Moreover, the end of the lead 74 which is formed of magnetic material is formed into a loop (in a plane perpendicular to the paper in FIG. 2) to increase its effectiveness as a collector of magnetic flux from the magnet 60. The presence of the magnetic flux so collected causes closure of the switch contacts. The lead 76 extends into the interior of the magnetic housing 64 so that it will not be influenced by the field from the magnet 60 thereby avoiding any tendency for double switch closure for each traverse of the magnetic field past the sensor. The lead 74 is welded to a conductor 78 which in turn is secured to the grounded housing 64. The lead 76 is connected to a conductor 80 as well as to one terminal of the coil 68. The other terminal of the coil is connected to a conductor 82. The entire reed switch including the lead 74, portions of the lead 76 and conductor 78 as well as the coil 68 are potted in an epoxy material 69 to secure the components into an integral unit connected with the housing 64 and to protect the reed switch.

Schematically the sensors 44, one for each wheel assembly, are shown in FIG. 3. The battery 84 is connected to the vehicle ignition key switch and in particularis connected to a movable contact 86 which engages a stationary contact 88 when the ignition switch is in the "start" or "solenoid" position and engages a stationary contact 90 or accessory terminal of the ignition switch when the switch is in the vehicle "run" position. The contact 90 is connected through a diode 92 and a resistor 94 to a conductor 96 which in turn is connected to the anodes of the LED's 56, the LED's having their cathodes connected to the conductors 80 leading to the respective sensors 44. The contact 88 is connected through a diode 98 to the conductor 96 which in turn, is connected through a diode 100 to the cathode of the diode 92. The latter cathode is connected through the master warning lamp 58 to the anodes of a plurality of diodes 102 each having their cathodes connected to one of the conductors 82. The conductors 82 are each connected through one of a plurality of diodes 104 which are in turn connected to a pulse generating circuit 106. The pulse generating circuit 106 includes a capacitor 108 serially connected with the switch contact 88, a resistor 110 and the base of a transistor 112. The collector-emitter circuit of the transistor 112 is connected between the diodes 104 and ground. Each side of the capacitor 108 is connected through a large resistor 114 to ground.

In operation, on initial vehicle start-up, the movable switch contact 86 is moved into engagement with the contact 88 so that battery voltage is applied to each of the indicating circuits each comprising a diode 56 and a sensor 44 and in addition voltage is supplied through the diode 100 and the lamp 58 and the diodes 102. When the voltage is initially applied to the contact 88, the pulse generating circuit 106 is actuated. By charging the capacitor 108, the charging current flowing through resistor 110 causes the transistor 112 to conduct for the short period required for the capacitor 108 to become charged. The resulting current pulse through the transistor 112 allows current to flow through each of the indicating circuits including the LED's 56, the coils 68, the conductors 82 and the diodes 104. The coils 68 are thus energized, each creating a magnetic flux to close its associated magnetic reed switch 66. Thereupon current flows through each indicator circuit and to the closed switch circuit to ground, the switches 66 being latched closed by the latching coils 68. Thus each element in each indicator circuit is tested, the test being verified by the illumination of the LED's. The master warning lamp 58 is of course also illuminated since it is grounded through the diodes 102 and the reed switches.

The warning indicators remain steadily illuminated so long as the contact 88 of the ignition switch is energized. When, however, the movable contact 86 is separated from the contact 88 and returned to its accessory terminal position, the voltage to the indicator circuit is momentarily interrupted for a time long enough to cause the coil 68 to de-energize thereby unlatching the reed switches. The system is then in standby position with voltage applied to the indicator circuit through the contact 90, diode 92 and the voltage dropping resistor 94 which compensates for the higher operating voltage in the run position compared to the low voltage available during vehicle starting. Then whenever a low pressure occurs in a tire, the resultant magnetic field is applied to reed switch 66 of the respective sensor 44, causing closure of that switch and causing current to flow through its associated LED 56 and latching coil 66, thus the reed switch is latched closed to maintain a steady and continuous illumination of the respective LED 56 and provide steady illumination of the master warning lamp 58 as well, which has its circuit completed through the closed reed switch and one of the diodes 102. The warning indicators thus remain energized as long as power is supplied through the accessory terminal 90.

It will thus be seen that the circuit according to this invention provides during the start position of a vehicle key switch a test of the operability not only of the indicator lamps but also of the reed switches, the response of the reed switches to a pulse magnetic field simulating actual sensing conditions, and the latching effectiveness of each coil.

The embodiments of the invention in which an exclusive property or privilege is claimed are defined as follows:

1. In a low tire pressure indication system having magnet means for providing a magnetic field when low tire pressure occurs and an indicator circuit having a reed switch responsive to the magnetic field which causes the closure of the reed switch during a low tire pressure condition, the indicator circuit comprising
   a power supply,
   a coil and an indicator device serially connected with the reed switch and the power supply whereby the indicator device and coil are energized when the reed switch is closed, the magnetic flux of the coil being coupled to the reed switch to close the reed switch if it is open and latch the reed switch closed when the coil is energized,
   a control switch connected to said power supply having a first and a second position which in the first position closes the indicator circuit to furnish power to actuate the indicator device when the reed switch is closed in response to the magnetic field when low tire pressure occurs and which in the second position furnishes electrical power to the indicator circuit during circuit testing,
   and a pulse developing circuit responsive to movement of the control switch to its said second position including means connected in series with said coil and in shunt with said reed switch for momentarily energizing the coil for a time period sufficiently long to close the reed switch whereby the reed switch is latched closed to energize and thereby test the indicator circuit so long as the control switch is in said second position, the movement of said control switch from said second to said first position being operative to interrupt the supply of power to said coil for a time period sufficient to permit unlatching of said reed switch whereby said system is set to provide low tire pressure indication.

2. In a low tire pressure indication system having magnet means for providing a magnetic field when low tire pressure occurs and an indicator circuit having a reed switch responsive to the magnetic field which causes the closure of the reed switch during a low tire pressure condition, the indicator circuit comprising
   a power supply
   a coil and an indicator device serially connected with the reed switch and the power supply whereby the indicator device and coil are energized when the reed switch is closed, the magnetic flux of the coil being coupled to the reed switch to close the reed switch if it is open and latch the reed switch closed when the coil is energized, a control switch having a movable contact connected to said power supply and selectively connectable to first and second stationary contacts in a first and a second switch position respectively which in the first position closes the indicator circuit through the first contact to furnish power to actuate the indicator device when the reed switch is closed in response to the magnetic field when low tire pressure occurs and which in the second position furnishes electrical power through the second contact to the indicator circuit during circuit testing, and a pulse developing circuit responsive to movement of the control switch to its said second position including a transistor having its emitter-collector circuit connected in series with said coil and in shunt with said reed switch and its base connected through a capacitor to the second position of the control switch whereby the transistor conducts a current pulse upon moving the control switch to the second position for momentarily energizing the coil for a time period sufficiently long to close the reed switch whereby the reed switch is latched closed to energize and thereby test the indicator circuit so long as the control switch is in said second position, the movement of said control switch movable contact from said second to said first contact being effective to momentarily disconnect the power supply from said coil for a time period sufficient to permit unlatching of said reed switch whereby said system is set to provide low tire pressure indication.

3. In a low tire pressure indication system for a wheeled vehicle having magnet means for each wheel for providing a magnetic field when low tire pressure occurs and an indicator circuit having a reed switch for each wheel, respectively, responsive to the magnetic field which causes the closure of the reed switch during a low tire pressure condition, the indicator circuit comprising a vehicle power supply, a coil and an indicator device comprising a light emitting diode serially connected with each said reed switch and the power supply whereby each indicator device and coil are energized when the respective reed switch is closed, the magnetic flux of each coil being coupled to its respective reed switch to close the said reed switch if it is open and latch the reed switch closed when the coil is energized, a manually operated control switch for the vehicle connected to said power supply having a first and a second, vehicle starting, position which in the first position closes the indicator circuit to furnish power to actuate any indicator device when its respective reed switch is closed in response to the magnetic field when low tire pressure occurs for its associated wheel and which in the second position furnishes electrical power to the indicator circuit during circuit testing, and a pulse developing circuit responsive to movement of the control switch to its said second position including means connected through isolating diodes in series with each said coil and in shunt with said reed switch for momentarily energizing each coil for a time period sufficiently long to close each reed switch whereby the reed switches are latched closed to energize and thereby test the indicator circuit so long as the control switch is in said second position, the movement of said control switch from said second to said first position being operative to interrupt the supply of power to said coils for a time period sufficient to permit unlatching of said reed switches whereby said system is set to provide low tire pressure indication.

* * * * *